May 15, 1962 R. C. QUACKENBUSH 3,034,549
POWER OPERATED HAND ROUTER
Filed July 18, 1960 2 Sheets-Sheet 2
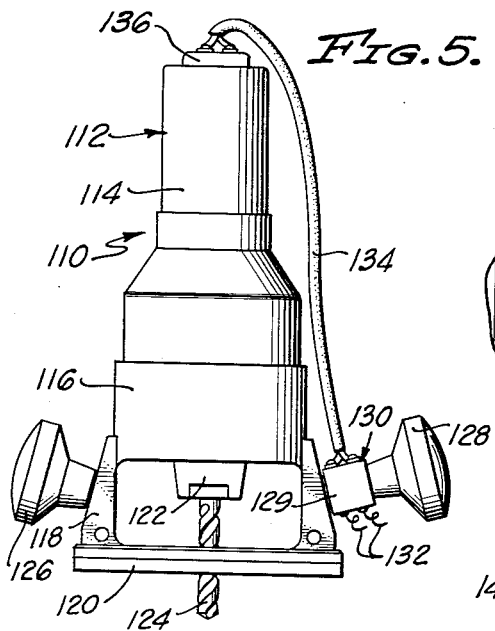
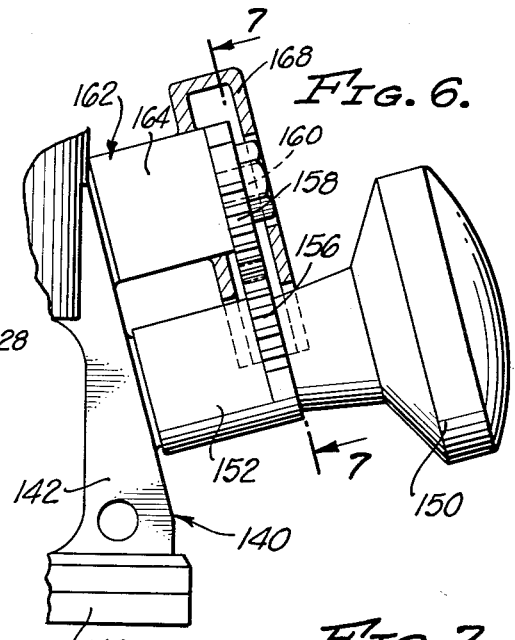
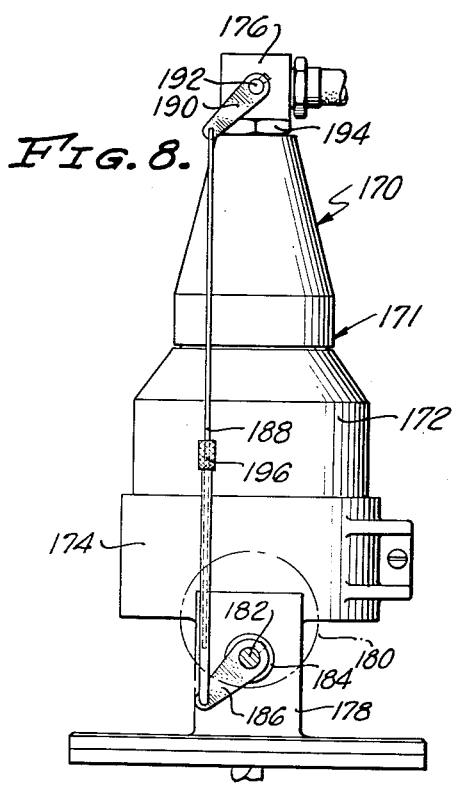
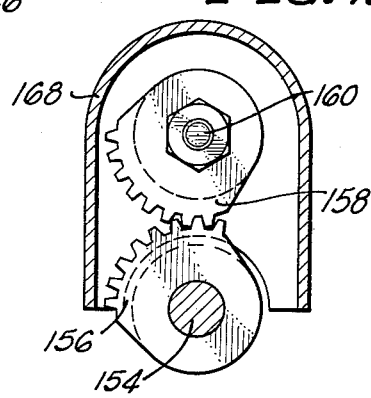
INVENTOR.
ROBERT C. QUACKENBUSH
BY Thomas P. Mahoney
ATTORNEY : # 3,034,549
POWER OPERATED HAND ROUTER
Robert C. Quackenbush, 1330 Beaudry Blvd.,
Glendale, Calif.
Filed July 18, 1960, Ser. No. 43,428
5 Claims. (Cl. 144—136)

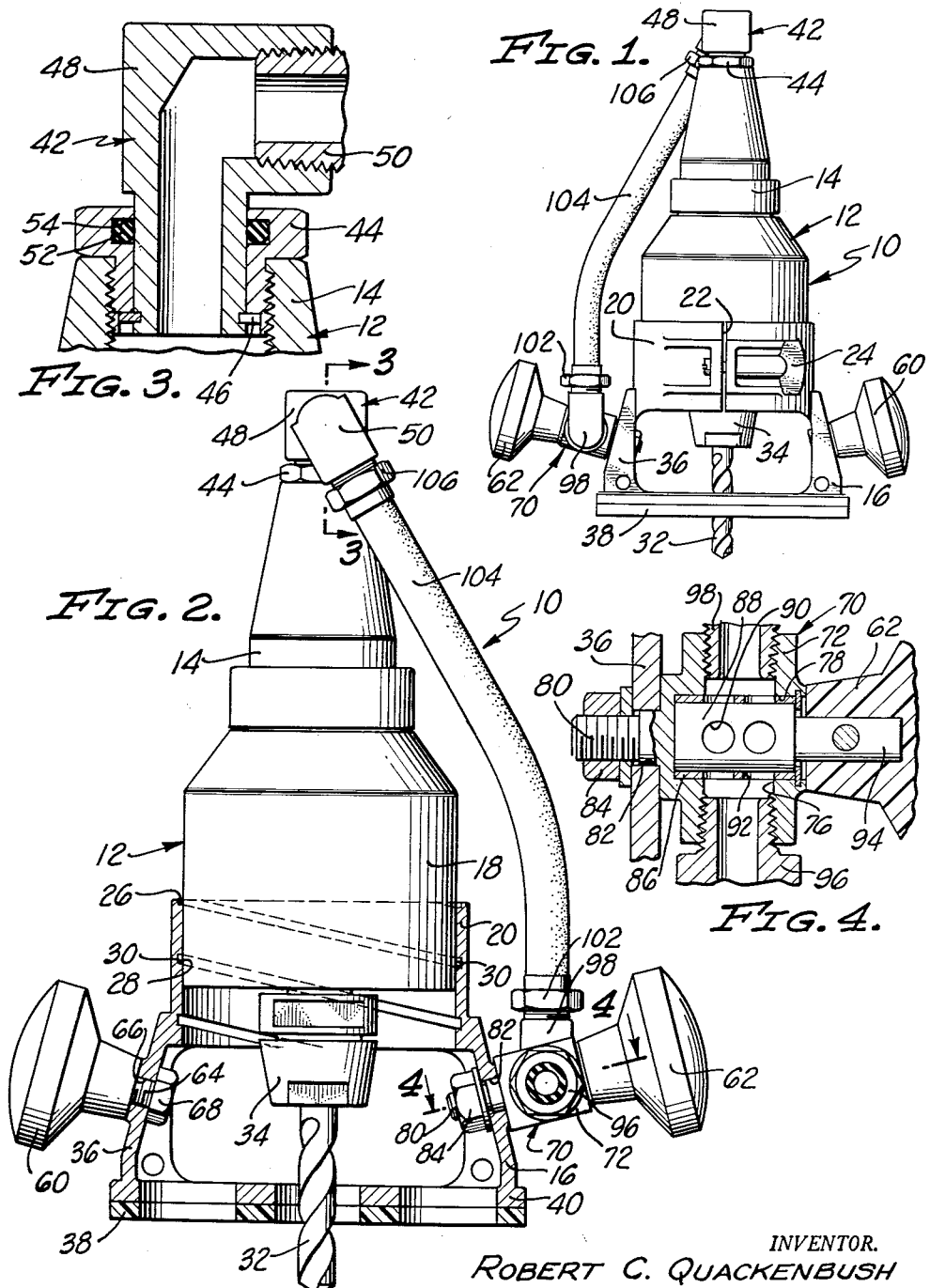

This invention relates to a router and, more particularly, to a motor powered router which is adapted to be manipulated and guided by an operator utilizing the same. Such routers are utilized conventionally to form edges and grooves or to remove material from such edges or openings and are customarily guided by the hands of an operator utilizing the same.

In conventional router constructions the energizing motor is mounted in the housing of the router at a point remote from the locations of the manipulating handles grasped by the operator utilizing the router and the control for starting or stopping the motor is located at a point correspondingly remote from the points at which the manipulating handles of the router are located. Therefore, when the operator wishes to stop or start the motor of the router, he must release one of the manipulative handles and operate the motor control. Thus, for a critical interval the operator must manipulate the router with one hand. Such one-handed operation of the router has resulted, in the past, in damaged workpieces or in injuries to the operator.

It is, therefore, an object of my invention to provide a router which eliminates the necessity for the operator's removal of his hands from the associated manipulative handles in order to start, stop or otherwise control the drive motor of the router. This desirable object is achieved by the provision of manipulative handles, at least one of which is operatively connected to the control for the motor, and thus the operator can start or stop or otherwise control the motor by appropriate rotational or other movement of the one manipulative handle.

Another object of my invention is the provision, in a router of the aforementioned character, of a plurality of manipulative handles disposed at locations remote from the drive motor of said router with one of said handles being operatively connected to the housing of the router through a control for the router motor.

A further object of the invention is the provision, in a router of the aforementioned character, of a pneumatic motor which is adapted to be started or stopped by a control valve, said control valve having one of the plurality of manipulative handles of said router operatively connected thereto so that the operator of the router may start or stop the pneumatic motor, or otherwise control the same, without the necessity of removing his hand from the associated manipulative handle.

Another object of my invention is the provision, in a router of the aforementioned character, of a two-part housing with one part of the housing incorporating the drive motor of the router and the other part of the housing having a pair of manipulative handles thereupon, said one part of the housing being adjustable with respect to the other part thereof and one of the manipulative handles being operatively connected to a control for the motor, said motor being connected to said control by a flexible connection permitting adjustment of said one part of said housing with respect to the other part thereof.

Other objects and advantages of the invention will be apparent from the following specification and the accompanying drawings, which are for the purpose of illustration only and in which:

FIG. 1 is a front elevational view of a router constructed in accordance with the teachings of my invention;

FIG. 2 is an enlarged, partially sectional view of said router;

FIG. 3 is an enlarged, vertical sectional view taken on the broken line 3—3 of FIG. 2;

FIG. 4 is an enlarged, transverse sectional view taken on the broken line 4—4 of FIG. 2;

FIG. 5 is a front elevational view of an alternative embodiment of the invention;

FIG. 6 is an enlarged, fragmentary sectional view of yet another embodiment of the invention;

FIG. 7 is a vertical sectional view taken on the broken line 7—7 of FIG. 6; and

FIG. 8 is a side elevational view of yet another embodiment of the invention.

Referring to the drawings and particularly to FIGS. 1–4 thereof, I show a router 10 constructed in accordance with the teachings of my invention and embodied in a housing 12. One part 14 of the housing has a pneumatic motor incorporated therein and the other part 16 of the housing is adapted to support said one part on a surface across which the router 10 is moved.

The one part 14 of the housing 12 has a cylindrical lower extremity 18, as best shown in FIG. 2 of the drawings, mounted in a corresponding cylindrical collar 20 which is split at 22, FIG. 1, and which is compressed upon the periphery of said cylindrical lower extremity by means of a thumbscrew 24. The inner wall of the collar 20 incorporates upper and lower helices 26 and 28 which are engaged by radial pins 30 projecting from the cylindrical lower extremity 18 of the one part 14 of the housing 12.

Therefore, when the thumbscrew 24 is released, the one part 14 of the housing 12 can be rotated with reference to the other part 16 thereof to raise or lower said one part with respect to said other part and thus to correspondingly raise or lower a router tool 32 which is connected through a chuck 34 to the drive shaft of the motor, not shown. The lower extremity of the other part 16 is constituted by a cage 36 having a foraminous pad 38 formed from plastic or the like secured thereto and mounted upon a correspondingly foraminous portion 40 of said cage.

The pad 38 is adapted to engage a surface upon which the router 10 is to be moved and thus, the other portion 16 of the housing 12 supports the one portion 14 thereof. Operatively secured to the upper extremity of the one portion 14 of the housing 12 is a swivel joint 42 which constitutes a means for introducing air under pressure into the interior of the one portion 14 of the housing 12 to drive the router motor, not shown. The swivel 42 includes a gland nut 44 which is threadedly engaged in corresponding threads in the upper extremity of the one portion 14 of the housing 12. Retained in operative relationship with the lower extremity of the gland nut 44 by means of a snap ring 46 is a right angle fitting 48 which has a hose fitting 50 threadedly engaged therein. An O-ring 52 is supported by the gland nut 44 in an annular groove 54 and engages the perimeter of the lower extremity of the right angle fitting 48 to prevent leakage of air under pressure passing through said fitting to the motor, not shown.

Mounted upon the cage 36 at a point remote from the upper extremity of the one portion 14 of the housing 12 is a pair of manipulative handles 60 and 62. The handle 60 has a threaded shank 64 inserted through a corresponding opening 66 in the cage 36 and retained in operative engagement with said cage by means of a nut 68. The other handle 62 is operatively connected to the cage 36 through the body 72 of a control valve 70, as best shown in FIGS. 1–2 and 4 of the drawings.

The body 72 of the control valve 70 is substantially rectangular and incorporates a longitudinal bore 76 and a transverse bore 78. Formed integrally with the body 72 is a stud 80 which projects through a corresponding opening 82 in the cage 36 and is secured by a nut 84 to said cage. A cylindrical bushing 86 is located in the transverse bore 78 and is adapted to serve as a seat for a rotary valve member 88 having ports 90 adapted to be aligned with corresponding ports 92 in said bushing. The rotary valve member 88 is connected to the handle by means of a shank 94 formed integrally with said rotary valve member.

The lower extremity of the longitudinal bore 76 has an air inlet fitting 96 threadedly engaged therewith and connected to a source of pressure air and the upper extremity has a hose fitting 98 threadedly engaged therewith, said fitting being engaged by a corresponding fitting 102 on the lower extremity of a flexible air hose 104 whose upper extremity has a fitting 106 thereupon. Therefore, when the handle 62 is rotated into the position shown in FIG. 4 of the drawings wherein the ports 90 in the rotary valve member 88 are displaced from the ports 92 and the valve seat constituted by the cylindrical bushing 86, no pressure air will flow through the valve 70 to the air hose 104 and, thence, through the fitting 48 of the swivel 42 to the interior of the one portion 14 of the housing 12 and to the drive motor, not shown.

However, rotation of the handle 62 will juxtapose the ports 90 of the rotary valve member 88 with the ports 92 of the cylindrical bushing 86 constituting the valve seat and air under pressure may flow through the valve 70, the hose 104 and the swivel 42 into the interior of the one part 14 of the housing 12 to start the drive motor, not shown. Therefore, when an operator is moving the router housing 12 across the surface of a work piece, not shown, and he desires to stop the motor, he need merely rotate the manipulative handle 62 to correspondingly rotate the valve member 88 and thus move the ports 90 in said valve member from juxtaposition to the corresponding ports 92 in the bushing 86. In this manner the necessity for attempting to control the router 10 with one hand on the one manipulative handle 60 is eliminated and the possibility of injury to the workpiece or operator is obviated.

When adjustment of the one portion 14 of the housing 12 with respect to the other portion 16 thereof is desired, the thumbscrew 24 is released permitting relative rotation of the one portion 14 of the housing 12 with respect to the other portion 16 thereof and the pins 30 on the lower extremity 18 of the one portion 14 of the housing may move downwardly in the associated helices 26 and 28. When such relative rotational adjustment of the one portion 14 of the housing 12 with respect to the other portion 16 thereof takes place, the swivel 42 and the hose 104 constituting the flexible connection between the valve 70 and the motor, not shown, in the upper extremity of the one portion 14 of the housing 12 accommodates such relative rotation between said one and other parts of the housing 12 while still maintaining fluid communication between the valve 70 and the motor, not shown, in the upper extremity of said one part of said housing.

An alternative embodiment 110 of the router of the invention is shown in FIG. 5 of the drawings and is incorporated in a two-part housing 112, one part 114 of which is mounted for adjustment on the other part 116 thereof. The lower extremity of the other part 116 of the housing 112 is constituted by an open cage 118 having a work engaging pad 120 thereupon. The cage 118 encompasses a chuck 122 having a routing tool 124 mounted therein. The one part 114 of the housing 112 is adjustable with respect to the other part 116 thereof by the use of a collar in the same manner as the collar 20 of the previously discussed embodiment 10 of the invention.

Mounted on the cage 118 is a first manipulative handle 126 and operatively connected to the cage is a second manipulative handle 128. The operative connection of the second manipulative handle 128 to the cage 118 is constituted by the housing 129 of an electrical switch 130 connected to a source of potential through leads 132. The output of the switch is connected by a cable 134 to a rotor 136 in the upper extremity of the one portion 114 of the housing 112 to permit electric current to flow to an electric motor, not shown, in the interior of the upper extremity of said one portion of said housing.

Therefore, as in the case of the previously discussed embodiment of the invention, the manipulative handles 126 and 128 are utilized to guide the router 110 with respect to a workpiece, not shown. The switch 130 can be an on-off switch or can be a rheostat type switch which will increase or decrease the speed of the motor, not shown. Thus, an operator holding the manipulative handle 128 can start or stop the electric motor, not shown, or can increase or decrease the speed thereof as desired. At all times the operator has complete control of the router and need not remove his hands from the manipulative handle 128 to start or stop the drive motor. Moreover, when the one part 114 of the housing 112 is rotatably adjusted with respect to the other part 116 thereof, such adjustment can be accommodated by the flexible cable 134 connected with the associated rotor 136.

Shown in FIG. 6 of the drawings is a fragmentary portion of an alternative embodiment 140 of the router of the invention, said fragmentary portion constituting a fragment of the cage 142 of said router having the pad 146 upon the lower extremity thereof. One of the manipulative handles 150 is secured to the cage 142 in a bearing 152 which permits relative rotation of the manipulative handle 150 with respect to an associated fixed handle, not shown, which is also secured to the cage 142. Operatively connected to the shaft 154 of the handle 150 is a gear segment 156 entrained upon a corresponding segment 158 connected to the actuating shaft 160 of a control 162 mounted in a housing 164. The gear segments 156 and 158 are enclosed within a shroud 168 secured to the housing 164.

The control 162 may be constituted by either a pneumatic valve or an electrical switch. Therefore, rotation of the handle 150 will cause corresponding rotation of the gear segments 156 and 158 and consequent rotation of the control shaft 160 of the control 162 to start or stop, or, if desired, control the speed of an associated air or electrical drive motor. Of course, linkages or other operative connections may be substituted for the gear segments 156 and 158 and it is not intended that the teachings of the invention be limited to the particular embodiment of FIGS. 6 and 7 of the drawings nor to those of FIGS. 1–4 or 5 of the drawings.

An alternative embodiment 170 of the router of the invention is shown in FIG. 8 of the drawings as incorporated in a housing which is generally similar in its overall configuration to the housings of the previously described embodiments of the invention. The housing 171 includes one part 172 rotationally adjustable with respect to the other part 174 of said housing in the same manner as such rotational adjustment is accomplished in the previously discussed embodiments of the invention.

However, in the present embodiment of the invention the control valve 176 for the air motor, not shown, incorporated in the upper extremity of the one part 172 of the housing 171 of the router 170, is mounted upon the upper extremity of said one part of said housing. Manipulative handles are secured to the cage 178 at the lower extremity of the housing 171, one of said handles 180 being mounted for rotation with and upon a shaft 182 journalled in a bearing 184 on the cage 178.

The lever 186 is connected by an adjustable linkage 188 to a corresponding lever 190 mounted on the shaft 192 of the control valve 176. The control valve 176 is mounted in a swivel joint 194 to permit relative rotation between the valve 176 and the upper extremity of the one portion 172 of the housing 171 of the router 170. Rotation of the manipulative handle 180 will cause corresponding rotation of the levers 186 and 190 and corresponding rotation of the control valve shaft 192 to close or open said valve. Of course, an electric switch can be substituted for the pneumatic control valve 176, if an electric motor is utilized in substitution for the pneumatic motor, not shown.

When the one portion 172 of the housing 171 is adjusted with respect to the other portion 174 thereof, the linkage 188 can be correspondingly adjusted in length by the appropriate manipulation of a collet 196 which is threaded upon the linkage intermediate its extremities in a manner well known to those skilled in the art. The rotation of the one portion 172 of the housing 171 of the router 170 will, of course, be accommodated by relative rotation of the swivel fitting 194 with respect to said one part of said housing.

I thus provide by my invention a motor driven, hand manipulated router characterized by the fact that, at no time, need the operator of said router remove his hands from the manipulative handles utilized to position and control the movement of said router. Furthermore, the respective portions of the router may be adjusted with respect to each other and a flexible connection between the motor control and the motor itself will accommodate such adjustment without affecting the ability of one of the manipulative handles to start or stop said motor by its operative connection to said control.

I claim:

1. In a portable hand tool, the combination of: a housing incorporating a drive motor for driving a cutting tool; a pair of gripping handles mounted on said housing to facilitate the manipulation of said housing by an operator; and a valve mounted on said housing at a point remote from said motor, said valve having one of said handles operatively connected thereto whereby said operator may simultaneously manipulate said housing and control said valve.

2. In a hand tool, the combination of: a two-part housing, one part of said housing incorporating a drive motor and the other part of said housing being adapted to serve as a work engaging support for said one part; a control valve mounted on said other part of said housing and operatively connected to said motor; and a pair of gripping handles on said other part of said housing, one of said handles being operatively connected to said control valve to permit the simultaneous manipulation and control of said housing and said motor by an operator thereof.

3. In a hand tool adapted to be moved over a workpiece, the combination of: a housing having two parts, one of which is adjustable with respect to the other; a pneumatic drive motor mounted in said one part of said housing; a chuck operatively connected to said drive motor for receiving a cutting tool; a valve mounted on the other part of said housing and connected to said drive motor; a first manipulating handle connected to said other part of said housing; and a second manipulating handle connected to said other part of said housing and said valve whereby said first and second handles can be utilized to manipulate said housing and said second handle can be simultaneously utilized to control said motor.

4. In a hand controlled router, the combination of: a two-part housing, one part of which is movable for adjustment with respect to the other part; a motor mounted in said one part of said housing; a control valve mounted on said other part of said housing at a point remote from said motor; a flexible connection between said control valve and said motor consisting of a flexible hose and a swivel fitting on said one part of said housing; a first manipulative handle secured to said other part of said housing; and a second manipulative handle operatively connected to said other part of said housing and said control valve to permit simultaneous manipulation of said housing through said handles and of said control valve through said second handle.

5. In a pneumatic, hand-manipulated router, the combination of: a two-part housing, one part of which is mounted for rotary and vertical movement with respect to the other part; a pneumatic motor in said one part of said housing; a control valve mounted on said other part of said housing at a point remote from said motor; a flexible connection connecting said valve to said motor including a flexible hose having its lower extremity secured in fluid communication with said valve and a swivel on said one part of said housing connected to the upper extremity of said hose; a first manipulative handle connected to said other part of said housing at a point remote from said motor; and a second manipulative handle mounted upon said control valve and adapted both to manipulate said housing and adjust said control valve.

References Cited in the file of this patent

UNITED STATES PATENTS

| | | |
|---|---|---|
| 1,752,940 | Cilley | Apr. 1, 1930 |
| 1,883,392 | Moll | Oct. 18, 1932 |
| 2,591,002 | Pedron | Apr. 1, 1952 |
| 2,702,569 | Yelle | Feb. 22, 1955 |
| 2,751,945 | Beach | June 26, 1956 |
| 2,842,173 | Turner et al. | July 8, 1958 |
| 2,943,654 | Emmons | July 5, 1960 |